United States Patent
Bennett et al.

(10) Patent No.: US 8,752,138 B1
(45) Date of Patent: Jun. 10, 2014

(54) SECURING USER CONTACT INFORMATION IN COLLABORATION SESSION

(75) Inventors: David Scrymgeour Bennett, Issaquah, WA (US); Brian David Marsh, Seattle, WA (US); David H. Owens, Willoughby (AU); Christopher David Vander Mey, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/310,597

(22) Filed: Dec. 2, 2011

Related U.S. Application Data

(60) Provisional application No. 61/529,874, filed on Aug. 31, 2011.

(51) Int. Cl.
| | |
|---|---|
| *H04L 29/06* | (2006.01) |
| *G06Q 10/10* | (2012.01) |
| *G06F 21/62* | (2013.01) |
| *G06F 9/54* | (2006.01) |
| *H04M 3/56* | (2006.01) |
| *H04M 3/42* | (2006.01) |

(52) U.S. Cl.
CPC ............ *H04L 65/403* (2013.01); *G06Q 10/103* (2013.01); *G06Q 10/10* (2013.01); *G06F 21/6218* (2013.01); *G06F 9/542* (2013.01); *H04M 3/566* (2013.01); *H04M 3/42008* (2013.01); *H04M 3/56* (2013.01); *H04M 3/567* (2013.01)
USPC ......... 726/4; 379/93.21; 379/93.23; 370/260; 348/211.12; 348/E7.083; 726/28

(58) Field of Classification Search
USPC ........ 726/1–3, 21, 27–28; 707/781, 783–785; 709/225, 227–229
See application file for complete search history.

(56) References Cited

U.S. PATENT DOCUMENTS

| | | | | |
|---|---|---|---|---|
| 6,480,957 | B1* | 11/2002 | Liao et al. ...................... | 713/170 |
| 7,171,448 | B1* | 1/2007 | Danielsen et al. ............. | 709/205 |
| 7,213,156 | B2* | 5/2007 | Fukuda ........................ | 713/189 |
| 7,269,664 | B2* | 9/2007 | Hutsch et al. ................. | 709/246 |
| 7,269,854 | B2* | 9/2007 | Simmons et al. .............. | 726/29 |
| 7,350,070 | B2* | 3/2008 | Smathers et al. ............. | 713/150 |
| 7,412,060 | B2* | 8/2008 | Fukuda ........................ | 380/277 |
| 7,536,016 | B2* | 5/2009 | Benaloh ....................... | 380/277 |
| 7,636,691 | B2* | 12/2009 | Maari ............................ | 705/51 |
| 7,756,540 | B2* | 7/2010 | Tillet et al. .................... | 455/518 |
| 7,836,311 | B2* | 11/2010 | Kuriya et al. ................. | 713/185 |
| 7,861,312 | B2* | 12/2010 | Lee et al. ....................... | 726/27 |

(Continued)

*Primary Examiner* — Cordelia Zecher
*Assistant Examiner* — Richard McCoy
(74) *Attorney, Agent, or Firm* — McDermott Will & Emery LLP

(57) ABSTRACT

A system and machine-implemented method for providing access to one or more shared objects to a user participating in a collaboration session, including receiving a request from a user to receive access to one of one or more shared objects within a collaboration session, each shared object having a corresponding access control list including one or more authorized users having access to the shared object, determining whether the user has access to the one of the one or more shared objects by referencing the access control list in response to receiving the request and adding the user as an authorized user within the access control list for each of the one or more shared objects when it is determined that the user does not have access to the one of the one or more shared objects, such that the user is provided access to the one or more shared objects.

17 Claims, 5 Drawing Sheets

(56) References Cited

U.S. PATENT DOCUMENTS

| | | | |
|---|---|---|---|
| 7,912,971 B1* | 3/2011 | Dunn | 709/229 |
| 8,051,287 B2* | 11/2011 | Shetty et al. | 713/170 |
| 8,082,592 B2* | 12/2011 | Harris | 726/33 |
| 8,095,795 B2* | 1/2012 | Levy | 713/176 |
| 8,121,880 B2* | 2/2012 | O'Sullivan et al. | 705/7.24 |
| 8,130,952 B2* | 3/2012 | Shamoon et al. | 380/201 |
| 8,180,913 B2* | 5/2012 | Coleman | 709/231 |
| 8,185,932 B2* | 5/2012 | Dunn | 726/1 |
| 8,238,380 B2* | 8/2012 | D'Angelo | 370/522 |
| 8,245,033 B1* | 8/2012 | Shetty et al. | 713/160 |
| 8,325,896 B2* | 12/2012 | Alexandrov et al. | 379/202.01 |
| 8,346,950 B1* | 1/2013 | Andreessen et al. | 709/229 |
| 8,417,806 B2* | 4/2013 | Chawla et al. | 709/223 |
| 2002/0026592 A1* | 2/2002 | Gavrila et al. | 713/201 |
| 2002/0154779 A1* | 10/2002 | Asano et al. | 380/277 |
| 2003/0229884 A1* | 12/2003 | Carr et al. | 717/101 |
| 2004/0030656 A1* | 2/2004 | Kambayashi et al. | 705/59 |
| 2005/0015343 A1* | 1/2005 | Nagai et al. | 705/59 |
| 2006/0173846 A1* | 8/2006 | Omae et al. | 707/9 |
| 2008/0070697 A1* | 3/2008 | Robinson et al. | 463/42 |
| 2008/0072158 A1* | 3/2008 | Samele et al. | 715/751 |
| 2008/0104393 A1* | 5/2008 | Glasser et al. | 713/165 |
| 2008/0120230 A1* | 5/2008 | Lebegue et al. | 705/39 |
| 2008/0154899 A1* | 6/2008 | Carmony | 707/6 |
| 2009/0024931 A1* | 1/2009 | Bae | 715/748 |
| 2009/0164594 A1* | 6/2009 | Turbeville et al. | 709/206 |
| 2009/0172565 A1* | 7/2009 | Jackson et al. | 715/753 |
| 2009/0276628 A1* | 11/2009 | Cho et al. | 713/168 |
| 2009/0290710 A1* | 11/2009 | Tkachenko et al. | 380/203 |
| 2009/0307489 A1* | 12/2009 | Endoh | 713/168 |
| 2009/0313685 A1* | 12/2009 | Huang | 726/7 |
| 2009/0315670 A1* | 12/2009 | Naressi et al. | 340/5.8 |
| 2009/0319913 A1* | 12/2009 | Serr et al. | 715/753 |
| 2010/0071027 A1* | 3/2010 | Agulnik et al. | 726/1 |
| 2010/0146639 A1* | 6/2010 | Kim et al. | 726/28 |
| 2010/0153857 A1* | 6/2010 | Sanchez et al. | 715/756 |
| 2010/0205541 A1* | 8/2010 | Rapaport et al. | 715/753 |
| 2010/0274634 A1* | 10/2010 | Ifrah | 705/10 |
| 2010/0278336 A1* | 11/2010 | Tahan et al. | 380/46 |
| 2010/0283827 A1* | 11/2010 | Bustamente | 348/14.08 |
| 2011/0131219 A1* | 6/2011 | Martin-Cocher et al. | 707/754 |
| 2011/0137947 A1* | 6/2011 | Dawson et al. | 707/785 |
| 2011/0138302 A1* | 6/2011 | Schleifer | 715/753 |
| 2011/0161669 A1* | 6/2011 | Eto | 713/168 |
| 2011/0295392 A1* | 12/2011 | Cunnington et al. | 700/90 |
| 2012/0042167 A1* | 2/2012 | Marking et al. | 713/171 |
| 2012/0151552 A1* | 6/2012 | Kandasamy et al. | 726/1 |
| 2012/0198328 A1* | 8/2012 | Kiley et al. | 715/234 |
| 2012/0216300 A1* | 8/2012 | Vivolo et al. | 726/30 |
| 2013/0007648 A1* | 1/2013 | Gamon et al. | 715/771 |
| 2013/0191491 A1* | 7/2013 | Kotha et al. | 709/213 |

* cited by examiner

SECURING USER CONTACT INFORMATION IN COLLABORATION SESSION

CROSS-REFERENCE TO RELATED APPLICATIONS

The present application claims the benefit of priority under 35 U.S.C. §119 from U.S. Provisional Patent Application Ser. No. 61/529,874 entitled "SECURING USER CONTACT INFORMATION IN COLLABORATION SESSION," filed on Aug. 31, 2011, the disclosure of which is hereby incorporated by reference in its entirety for all purposes.

BACKGROUND

The subject disclosure generally relates to facilitating collaboration between users, and in particular to facilitating secure e-mail sharing between a plurality of participants in a collaboration session.

Each object shared within a collaboration environment may be associated with an Access Control List (ACL). The ACL includes the participants of the collaboration environment granted access to the shared object. Shared objects may include files, documents, images, tools, posts, or other data shared for the purpose of collaboration within the environment.

When a user having access to a shared object, accesses the shared object, the user is able to view an access list associated with the shared object, which includes the information for all users included within the ACL of the shared object. Thus, e-mail addresses (and/or other sensitive contact information) of participants within a collaboration environment are exposed. In some contexts (e.g., cold calls, new contacts met through social networks, initial meetings), such exposure may be undesirable since it may provide an unwanted point of contact.

Thus, a method for securing user contact information within a collaboration session may be desirable.

SUMMARY

The disclosed subject matter relates to a method, executed by one or more computing devices, for providing access to one or more shared objects to a user within a collaboration session, the method comprising receiving an indication of a request from a user to receive access to one of one or more shared objects within a collaboration session, each shared object having a corresponding access control list, the access control list including one or more authorized users having access to the shared object, wherein the user is one of one or more users participating in the collaboration session. The method further comprising, determining, using the one or more computing devices, whether the user has access to the one of the one or more shared objects by referencing the access control list associated with the one of the one or more shared objects in response to receiving the indication of the request and adding the user as an authorized user within the access control list for each of the one or more shared objects when it is determined that the user does not have access to the one of the one or more shared objects, such that the user is provided access to the one or more shared objects.

The disclosed subject matter also relates to a system for providing access to one or more shared objects to a user within a collaboration session, the system comprising one or more processors and a machine-readable medium comprising instructions stored therein, which when executed by the processors, cause the processors to perform operations comprising receiving an indication of a request from a user to receive access to one of one or more shared objects within a collaboration session, each shared object having a corresponding access control list, the access control list including one or more authorized users having access to the shared object, wherein the user is one of one or more users participating in the collaboration session. The operations further comprising determining whether the user has access to the one of the one or more shared objects by referencing the access control list associated with the one of the one or more shared objects in response to receiving the indication of the request and adding the user as an authorized user within the access control list for the one of the one or more shared objects when it is determined that the user does not have access to the one of the one or more shared objects, such that the user is provided access to the one of the one or more shared objects.

The disclosed subject matter also relates to a machine-readable medium comprising instructions stored therein, which when executed by a machine, cause the machine to perform operations comprising receiving an indication of a request from a user to receive access to one of one or more shared objects within a collaboration session, each shared object being associated with one or more authorized users having access to the shared object, wherein the user is one of one or more users participating in the collaboration session. The operations further comprising determining whether the user is one of the one or more authorized users associated with the one of the one or more shared objects in response to receiving the indication of the request. The operations further comprising providing the user with a notification of the consequences of being granted access to the shared object when it is determined that the user does not have access to the one of the one or more shared objects and adding the user as an authorized user associated with one or more shared objects upon receiving an indication from a user that the user agrees with the notification, such that the user is provided access to the one or more shared objects.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
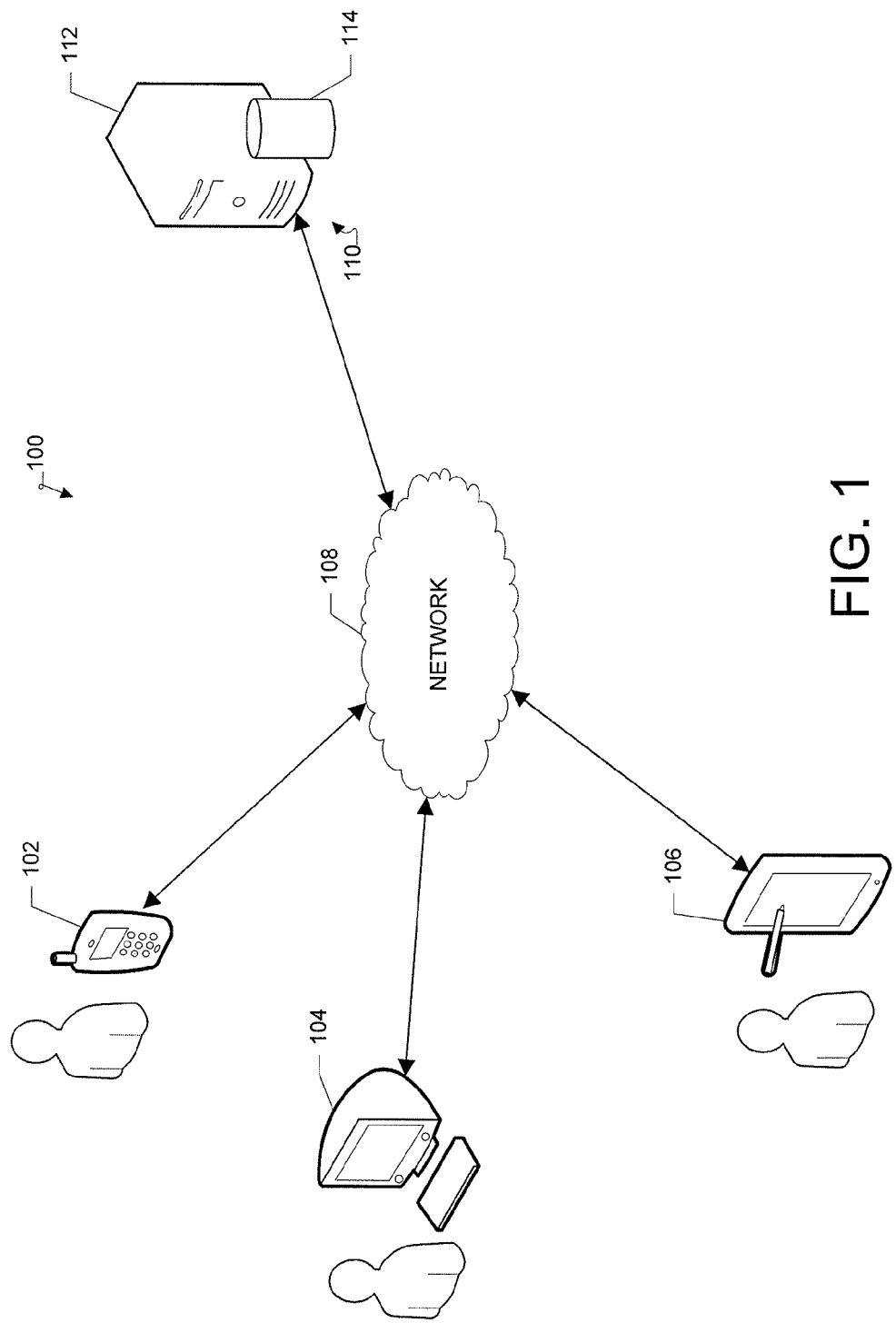
FIG. 1 illustrates an example client-server network session which provides for a secure collaboration session.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As used herein, "collaboration session" refers to a computer-based session including a group of people (participants) involved in a common task to achieve a common objective. During a collaboration session various objects may be shared among the participants for the purpose of collaboration. Shared objects may include files, documents, images, tools, posts, or other data shared for the purpose of collaboration within the collaboration session. Each object shared within a collaboration session may be associated with an Access Control List (ACL). An access control list (ACL), with respect to a computer file system, is a list of permissions attached to an object. An ACL specifies which users or system processes are granted access to objects, as well as what operations are allowed on given objects. Each entry in a typical ACL may specify a subject and an operation.

With respect to objects within a collaboration session, the ACL may include a listing of the participants of the collaboration session granted access to the shared object. When a participant having access to the shared object, accesses the shared object, the participant is able to view a listing of participants as maintained within the ACL, which may include contact information of the participants. The ACL associated with a shared object may persist beyond the collaboration session, such that any users who view a shared object may view the contact information of the participants included within the ACL associated with the shared objects even beyond the collaboration session.

The subject disclosure provides a method for securely protecting user contact information (e.g., e-mail addresses) in a collaboration session. This is achieved by delaying the grant of access to shared objects within a collaboration session, until a user has explicitly requested access and has been fully informed of the information being shared with other participants within the collaboration session. As used herein, a "secure collaboration session" refers to a collaboration session providing protection of participant's contact information by delaying grant of access to shared objects within the collaboration session, for at least some participants of the collaboration session, until an explicit request is received from a participant.

Users are able to join a secure collaboration session (e.g., a meeting) being conducted by various collaboration tools (e.g., Google Docs). Initially, the user will not have access to any shared objects within the secure collaboration session. Thus, the contact information (e.g., e-mail address) of the user is not exposed to the other participants of the secure collaboration session when the user joins the session. The user may then view the shared objects being shared within the secure collaboration session and may explicitly request access to the shared objects. Upon receiving the user request, the user is provided with a thorough explanation of the information being shared with other participants when the user is granted access to the shared object.

When the user, having been informed of the consequences, agrees to have access to the shared objects, the user is then added to the ACL for the shared object and is granted access to the shared objects. Requesting access may only be performed once per secure collaboration session. Thus, if more than one shared object exists in a secure collaboration session, upon the user requesting access to and being granted access with respect to a first shared object, the system may automatically add the user (e.g., including the contact information of the user) to the ACL for all shared objects within the secure collaboration session.

Once the user is granted access, the user's contact information is then visible to all participants of the secure collaboration session having access to shared objects (e.g., through the ACL of the shared objects). In this manner, the visibility of the user's contact information is with the complete knowledge and consent of the user.

The process of protecting contact information (e.g., e-mail addresses) may be performed only with respect to specific groups. For example, the system may create exceptions for e-mail addresses within the same domain as the initiator of the secure collaboration session, such that users within the same domain will automatically have access to the shared objects within the secure collaboration session. Thus, the process of delayed access to shared objects may only be performed with respect to external participants (e.g., users having an external e-mail address).

FIG. 1 illustrates an example client-server network session which provides for a secure collaboration session. A network session 100 includes a number of electronic devices 102-106 communicably connected to a server 110 by a network 108. Server 110 includes a processing device 112 and a data store 114. Processing device 112 executes computer instructions stored in data store 114, for example, to assist in facilitating a secure collaboration session between electronic devices 102- 106.

In some example embodiments, electronic devices 102- 106 can be computing devices such as laptop or desktop computers, smartphones, PDAs, portable media players, tablet computers, televisions with one or more processors embedded therein or coupled thereto, or other appropriate computing devices that can be used to for group conversation within a social network. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). Furthermore, network 108 can be a public communication network (e.g., the Internet, cellular data network, dialup modems over a telephone network) or a private communications network (e.g., private LAN, leased lines).

Users interacting with electronic devices 102-106 can participate in a secure collaboration session (e.g., using server 110), to collaborate on shared objects including files, documents, images, tools, posts, or other data shared for the purpose of collaboration. A user interacting with one of the electronic devices 102-106 may initiate a secure collaboration session and share one or more objects. The user may further invite one or more other users (e.g., users interacting with electronic devices 102-106) to participate in the session. Upon initiating the session, the system may issue a notification (e.g., email message) notifying each of the invitees to join the secure collaboration session. Each of the one or more shared objects is associated with an ACL and may include at least the user initiating the session.

As invitees choose to participate in the secure collaboration session they are presented with a graphical user interface displaying a graphical representation of the secure collaboration session. The participants may further be presented with a listing of the one or more shared objects associated with the secure collaboration session. In addition to the shared objects specified by the user initiating the session, shared objects may further be added by participants once they have joined the session. Each shared object added to the secure collaboration session associated with an ACL including a listing of one or more users having access to the shared object.

To provide for secure sharing of contact information of the participants, access to the share objects may not be automatically granted as an invitee joins the secure collaboration session. Instead, at least for some of the invitees (e.g., those invitees with an external email address), the system provides a listing of the shared objects without granting access to the content of the shared object. Once the participant enters the session, the participant may then request to access the shared objects.

Upon receiving an indication of a request from the participant (e.g., at server 110), the system determines whether the participant has access to the shared object by checking the ACL associated with the shared object. For example, in one example, some participants (e.g., users within the same domain as the user initiating the meeting) may automatically be granted access to the shared objects. For example, where the contact information of a participant is already readily available to other participants (e.g., users within the same domain as the user initiating the meeting) the system may, upon detecting that the such participant has joined the secure collaboration session, automatically update the ACL for all shared objects within the session, such that the participant has access to the shared objects (e.g., without having to explicitly request access to the shared objects).

For other participants who are not automatically granted access to the shared objects within the secure collaboration session, upon receiving a request or at indication of a request (e.g., at server 110), the system may prompt the participant and notify them of the consequences of being granted access, including that their contact information (e.g., email address) will be shared with other participants having access to the shared object. For example, the graphical user interface at the client device of the participant (e.g., electronic devices 102, 106 or 108) may be updated to display a prompt window. In some examples, the ACL for the document persists even after the session has expired, thus the participant may be notified that any users (e.g., in addition to those currently participating in the secure collaboration session) will have access to the participant's contact information. After receiving confirmation that the participant wishes to have access to the shared object, in view of the consequences of being granted access, the system may then update the ACL associated with the shared object to grant access to the participant and may provide the shared object for display to the participant. Furthermore, the system may further update the ACL for all other shared objects within the secure collaboration session (e.g., including those added by the user initiating the meeting, or other participants before or after the user is granted access to the shared object). In this manner, the prompt window is provided to the user once for each secure collaboration session.

Figure 2:
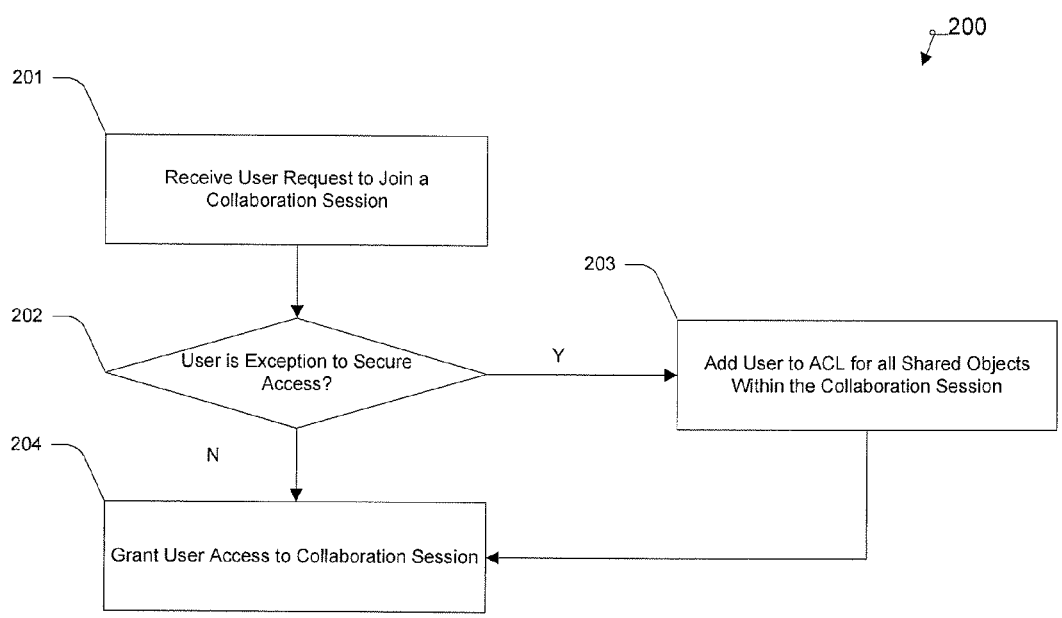
FIG. 2 illustrates a flow diagram of an exemplary process for providing a participant with access to a secure collaboration session.

FIG. 2 illustrates a flow diagram of an exemplary process 200 for providing a participant with access to a secure collaboration session. In step 201 the system receives an indication of a request from the user to join a secure collaboration session. For example, when a user receives an invitation (e.g., upon the secure collaboration session being initiated by a user), the user may then request to join the secure collaboration session.

Upon receiving the indication of the request in step 201, the process then continues to step 202 and the system determines whether the user is one of the users excepted from secure access measures. For example, the system may only provide secure access to those users whose contact information is not otherwise readily available to the other participants of the meeting. In one example, the users within the same domain or organization may have access to contact information of other users within the domain. The system may have access to one or more lists of users being exceptions to secure access or may alternatively have access to a set of exception rules (e.g., users having an email address within the same domain as user initiating the secure collaboration session).

If, in step 202, the system determines that the user is an exception to the secure access for the secure collaboration session, then in step 203 the user is added to the ACL list for all shared objects associated with the secure collaboration session. For example, the shared objects may include shared objects shared by the user initiating the secure collaboration session, or one or more other participants of the secure collaboration session.

Once step 203 is completed, or when the system determines that the user is not an exception to the secure access for the secure collaboration session (e.g., user is external to the domain, does not meet exception rules and/or is not listed as an exception), the process continues to step 204 and grants access to the user, such that the user is a participant of the secure collaboration session. Upon being granted access, the client device of the user (e.g., electronic devices 102, 104 or 106) may display a graphical user interface of the secure collaboration session. Thus, participants whose contact information the system determines should be secured (e.g., contact information of users who are not exceptions), are granted access to the collaboration session but do not have access to the shared objects within the collaboration session upon being granted access to the collaboration session. Additionally, because they do not have automatic access to shared objects (e.g., their names are not added to the ACL associated with each shared object), their contact information is not viewable by other participants having access to the collaboration session when they join the collaboration session.

Figure 3:
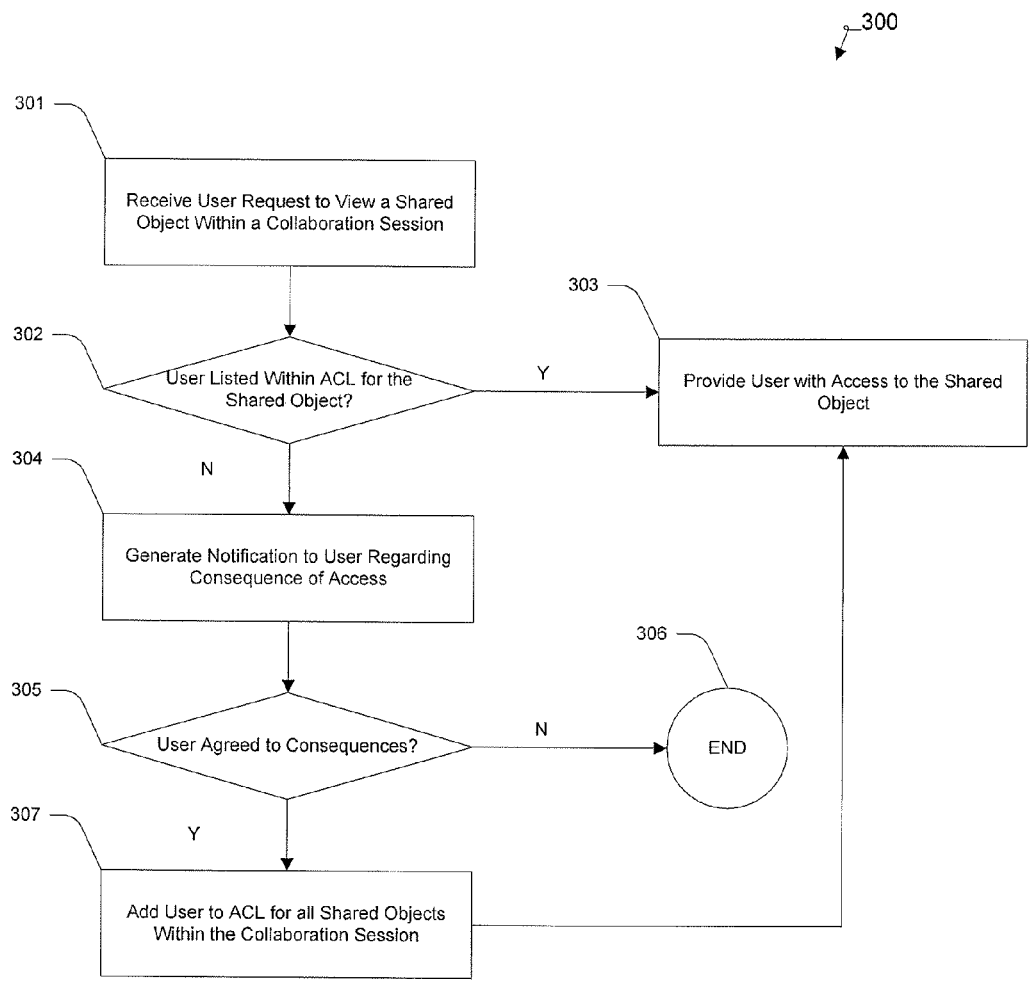
FIG. 3 illustrates a flow diagram of an exemplary process for providing a participant of a secure collaboration session with access to shared objects.

FIG. 3 illustrates a flow diagram of an exemplary process 300 for providing a participant of a secure collaboration session with access to shared objects. In step 301, the system may receive an indication of a request from a participant wanting to view a shared object within a secure collaboration session. For example, a participant viewing a graphical user interface of a secure collaboration session may select a link to a shared object within the secure collaboration session. The system may, upon receiving the indication of a selection from the participant, continue to step 302.

In step 302, the system determines whether the participant has access to the shared object, for example, by determining whether the participant is listed within the ACL associated with the shared object. If the participant is listed within the ACL of the shared object, then in step 303 the participant is provided with access to the shared object. For example, the system may retrieve the shared object and may provide the shared object for display at the participant's client device (e.g., electronic devices 102, 104 or 106).

Otherwise, if in step 302 it is determined that the participant is not listed within the ACL associated with the shared object, and thus does not have access to the shared object, in step 304, the system generates a notification to the participant regarding the consequences of being granted access. For example, a prompt window may be provided for display to the participant, notifying the participant that if the participant is given access to the desired shared object, the participant's contact information is shared with all participants having access to the shared object. Additionally, the ACL may be persistent such that once a participant is granted access to a shared object, his/her contact information will be available to all users having access to the shared object, even where the shared object is provided to such users outside the secure collaboration session. In such embodiments, the notification within the prompt window may further provide an explanation as to the persistence of the sharing of participant's contact information.

The system may only provide the prompt window to the participant once per secure collaboration session. Once access is granted with respect to one shared object, the system may automatically grant the participant with access to all other shared objects within the secure collaboration session. In such embodiments, the participant may further be notified that his/her contact information may be available to all users viewing all shared objects within the secure collaboration session. An example prompt window is illustrated in FIG. 4, described in more detail below.

Figure 4:
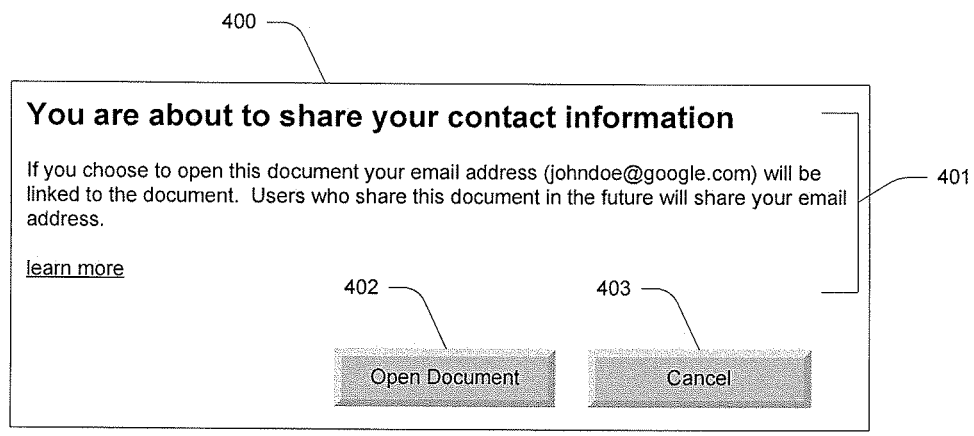
FIG. 4 illustrated an exemplary screen shot of a prompt window provided to a participant requesting access to a shared object within a secure collaboration session.

In step 305, the system may determine whether the participant has agreed to the notification (e.g., consequences of being granted access) displayed for example within the prompt window (e.g., prompt window 400 of FIG. 4). If the participant has agreed to the notification, in step 307, the system adds the participant to the ACL associated with the shared object. In one example, the system may additionally automatically add the participant to the ACLs for all other shared objects within the secure collaboration session (e.g., such that the notification is only necessary once per session). Next, the participant is provided with access to the shared object in step 303, as described above. Alternatively, if the participant does not agree to the notification provided in step 305, the process ends in step 306.

While various implementations and process are described with respect to ACLs, it should be understood that the above processes may be performed with respect to any secure collaboration session and shared objects, regardless of the manner in which access to the documents is managed. Thus, where other access management mechanisms may be available for managing access to the shared objects of the secure collaboration session, the same or similar steps as described above may be performed to provide participants of the secure collaboration session with access to shared objects while securing their contact information.

FIG. 4 illustrated an exemplary screen shot of a prompt window 400 provided to a participant requesting access to a shared object within a secure collaboration session. As illustrated, the prompt window includes a notification section 401 which provides the participant with an explanation of the consequences of being granted access to a shared document. Furthermore, the prompt window may 400 include an "Open Document" button 402 and a "Cancel" button 403. In one aspect, the Open Document button indicates an agreement to the consequences provided to the participant as notification 401. Upon receiving an indication of a participant's selection of the Open Document button 402, the system may add the to the ACL list of the shared object (e.g., document), and optionally, all other shared documents within the secure collaboration session. Conversely, the Cancel button 403 indicates a participant not accepting the consequences of having access to the document, and thus, would result in the participant not having access to the shared objects and the participant's contact information remaining hidden from all other participants and/or other users having access to one or more of the shared objects.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing session. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
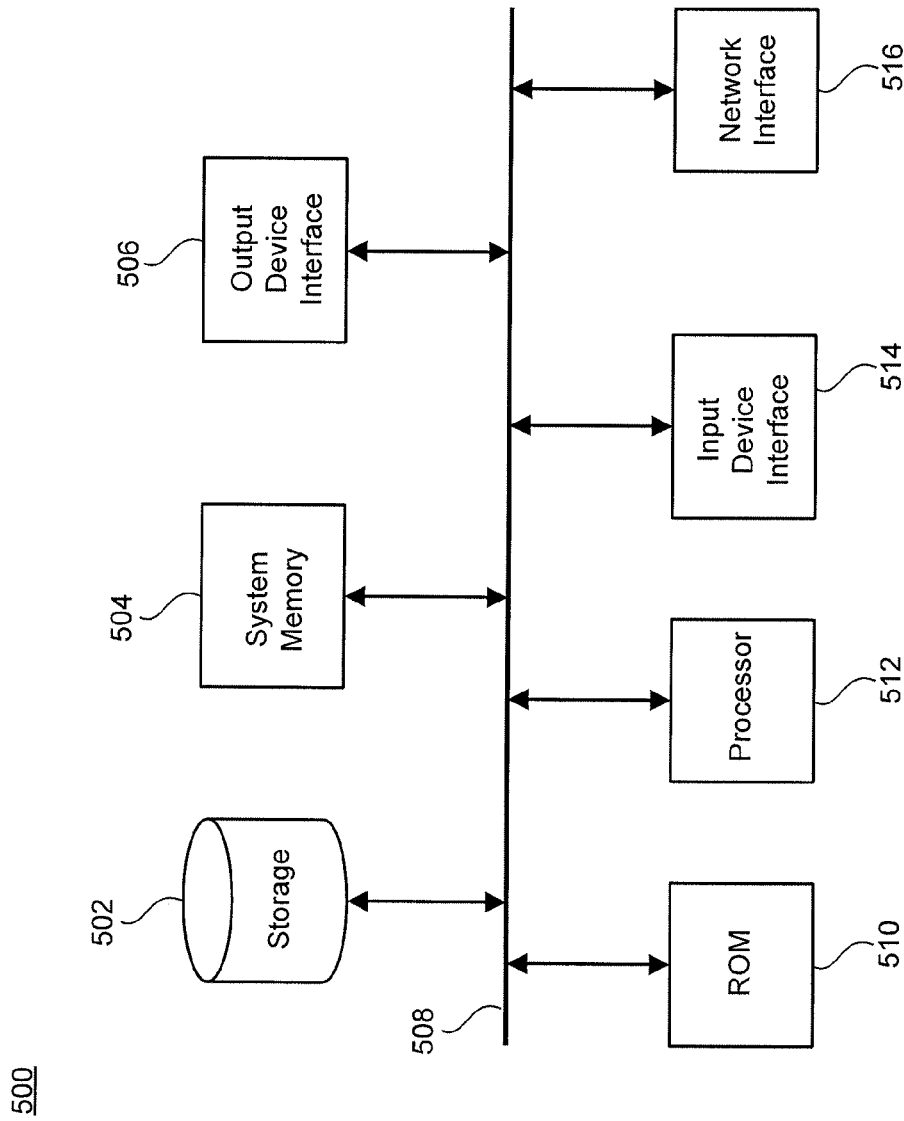
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for securing participant contact information within a collaboration session in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, executed by one or more computing devices, for providing access to one or more shared objects to a user within a collaboration session, the method comprising:
    receiving an indication of a request from a user to receive access to one of one or more shared objects within a collaboration session, each shared object of the one or more shared objects having a corresponding access control list, the access control list for each shared object of the one or more shared objects including one or more authorized users having access to the shared object of the one or more shared objects, wherein the user is one of one or more users currently participating in the collaboration session;
    determining, using the one or more computing devices, whether the user is authorized to access the one of the one or more shared objects by referencing the access control list associated with the one of the one or more shared objects in response to receiving the indication of the request, wherein contact information of the user is not accessible by the one or more authorized users, while the user is participating in the collaboration session, if the user is not an authorized user listed in the access control list associated with the one of the one or more shared objects; and
    providing a notification to the user in response to receiving the indication of the request when it is determined that the user is not authorized to access the one or more shared objects, the notification describing that contact information of the user will be accessible by the one or more authorized users having access to the one or more shared objects;
    adding the user as an authorized user within the access control list for each of the one or more shared objects when it is determined that the user is not authorized to access the one of the one or more shared objects upon receiving an indication that the user has agreed to the notification, such that the user is provided access to the one or more shared objects, wherein the adding the user as an authorized user within the access control list for each of the one or more shared objects causes the contact information of the user to be accessible by the one or more authorized users.

2. The method of claim 1, wherein the contact information for the one or more authorized users is viewable by the one or more authorized users.

3. The method of claim 1, wherein the step of providing a notification to the user comprises providing a prompt window for display to the user, the prompt window including the notification, and a selection mechanism for allowing the user to accept or reject the notification.

4. The method of claim 1, further comprising:
    receiving an indication of a request from the user to join the collaboration session;
    determining whether the contact information of the user should be secured within the collaboration session; and providing the user with access to the collaboration session without adding the user to the access control list associated with the one or more shared objects of the collaboration session when it is determined that the contact information of the user should be secured within the collaboration session.

5. The method of claim 4, further comprising:
adding the user as an authorized user within the access control list for each of the one or more shared objects within the collaboration session when it is determined that the contact information of the user should not be secured within the collaboration session; and
providing the user with access to the collaboration session.

6. The method of claim 4, wherein the step of determining whether the contact information of the user should be secured comprises determining whether the user is in the same domain as a second user initiating the collaboration session.

7. The method of claim 1, further comprising providing the user with access to the one of the one or more shared objects in response to adding the user as an authorized user within the access control list for each of the one or more shared objects.

8. The method of claim 7, wherein the step of providing the user with access comprises providing the shared object for display to the user.

9. The method of claim 1, wherein the one or more shared objects comprise objects added to the collaboration session by one or more users collaborating within the collaboration session.

10. The method of claim 1, wherein the access control list for each of the one or more shared objects comprises contact information for the authorized users.

11. A system for providing access to one or more shared objects to a user within a collaboration session, the system comprising:
one or more processors; and
a machine-readable medium comprising instructions stored therein, which when executed by the processors, cause the processors to perform operations comprising:
receiving an indication of a request from the user to receive access to one of one or more shared objects within a collaboration session, each shared object having a corresponding access control list, the access control list including one or more authorized users having access to the shared object, wherein the user is one of one or more users participating in the collaboration session;
determining whether the user has access to the one of the one or more shared objects by referencing the access control list associated with the one of the one or more shared objects in response to receiving the indication of the request, wherein the contact information of the user is not accessible by the one or more authorized users, while the user is participating in the collaboration session, if the user is not an authorized user of the access control list associated with the one or more shared objects;
providing a notification to the user when it is determined that the user does not have access to the one of the one or more shared objects, the notification describing that contact information of the user will be accessible by one or more authorized users having access to the one or more shared objects; and
adding the user as an authorized user within the access control list for the one of the one or more shared objects upon receiving an indication that the user has agreed to the notification when it is determined that the user does not have access to the one of the one or more shared objects, such that the user is provided access to the one of the one or more shared objects, wherein the adding the user as an authorized user within the access control list for the one of the one or more shared objects causes the contact information of the user to be accessible by the one or more authorized users.

12. The system of claim 11, further comprising:
adding the user as an authorized user within the access control list for other shared objects of the one or more shared objects when it is determined that the user does not have access to the one of the one or more shared objects, such that the user is provided access to all of the one or more shared objects.

13. The system of claim 11, further comprising:
receiving an indication of a request from the user to join the collaboration session;
determining that the contact information of the user should be secured within the collaboration session; and
providing the user with access to the collaboration session without adding the user to the access control list associated with the one or more shared objects of the collaboration session in response to determining that the contact information of the user should be secured within the collaboration session.

14. The system of claim 13, further comprising:
adding the user to the access control list associated with the one or more shared objects of the collaboration session when it is determined that the contact information of the user should not be secured within the collaboration session; and
providing the user with access to the collaboration session.

15. The system of claim 13, wherein the step of determining that the contact information of the user should be secured comprises determining that the user satisfies a pre-defined condition.

16. The system of claim 11, wherein the step of providing a notification to the user comprises providing a prompt window for display to the user, the prompt window including the notification, and a selection mechanism for allowing the user to accept or reject the notification.

17. A non-transitory machine-readable medium comprising instructions stored therein, which when executed by a machine, cause the machine to perform operations comprising:
receiving an indication of a request from a user to receive access to one of one or more shared objects within a collaboration session, each shared object of the one or more shared objects being associated with an access control list including a listing of one or more authorized users having access to the shared object, wherein the user is one of one or more users participating in the collaboration session;
determining whether the user is one of the one or more authorized users associated with the one of the one or more shared objects by referencing the access control list associated with the one of the one or more shared objects in response to receiving the indication of the request, wherein the contact of the user is not accessible by the one or more authorized users, while the user is participating in the collaboration session, if the user is not an authorized user within the access control list associated with the one or more shared objects;
providing the user with a notification of the consequences of being granted access to the shared object in response to the request when it is determined that the user does not have access to the one of the one or more shared objects; and adding the user as an authorized user within the access control list for the one of the one or more shared objects upon receiving an indication from a user that the user agrees with the notification, such that the user is provided access to the one or more shared objects, wherein the adding the user as an authorized user within the access control list for the one or more shared objects causes the contact information of the user to be accessible by the one or more authorized users associated with the one of the one or more shared objects.

\* \* \* \* \*